(12) United States Patent
Yamaguchi et al.

(10) Patent No.: US 7,258,822 B2
(45) Date of Patent: Aug. 21, 2007

(54) ORGANIC NONLINEAR OPTICAL MATERIAL AND NONLINEAR OPTICAL ELEMENT USING THE SAME

(75) Inventors: Yasuhiro Yamaguchi, Minamiashigara (JP); Yasunari Nishikata, Minamiashigara (JP); Hokuto Takada, Ebina (JP); Tomozumi Uesaka, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 438 days.

(21) Appl. No.: 10/936,536

(22) Filed: Sep. 9, 2004

(65) Prior Publication Data

US 2005/0173681 A1 Aug. 11, 2005

(30) Foreign Application Priority Data

Feb. 10, 2004 (JP) ............................. 2004-033803

(51) Int. Cl.
*F21V 9/08* (2006.01)
*G02B 5/23* (2006.01)
*G03C 1/73* (2006.01)
*G02F 1/01* (2006.01)

(52) U.S. Cl. ...................... 252/583; 252/582; 359/241

(58) Field of Classification Search ................. 252/583
See application file for complete search history.

(56) References Cited

U.S. PATENT DOCUMENTS

2005/0139813 A1* 6/2005 Yamaguchi et al. ........ 252/582

FOREIGN PATENT DOCUMENTS

JP   A 6-202177    7/1994
JP   A-2001-98071  4/2001

OTHER PUBLICATIONS

Guy Koeckelberghs et al., Synthesis and Properties of New Chiral Donor-Embedded Polybinaphthalenes for Nonlinear Optical Applications, Macromolecules, 2004, 37, 8530-8537.*
Michael J. Banach et al.; "Enhancement of Electrooptic Coefficient of Doped Films through Optimization of Chromophore Environment"; Chemistry of Materials; 1999; vol. 11; pp. 2554-2561.

Donald M. Burland et al.; "Second-Order Nonlinearity in Poled-Polymer Systems"; Chemical Reviews; 1994; vol. 94, No. 1; pp. 31-75.
M. Kakimoto et al., "Synthesis of Hiperbranched Aromatic Polymers from Self-polycondensation of Abn Type Monomers", Building Blocks of Nano-organized Systems, pp. 147-150, 2000.
M. Kakimoto, "Dendritic Macromolecules" High Polymers (The Society of Polymer Science), vol. 47, p. 804, 1998.
K. Ishizu "Nanotechnologies of Branched Polymers", IPC, 2000.
S. Yokoyama et al., "Application of Dendrimer into Nonlinear Optical Materials", High Polymers (The Society of Polymer Science), vol. 47, p. 828, 1998.

* cited by examiner

*Primary Examiner*—Randy Gulakowski
*Assistant Examiner*—Timothy J. Kugel
(74) *Attorney, Agent, or Firm*—Oliff & Berridge, PLC

(57) ABSTRACT

The present invention provides an organic nonlinear optical material including an organic compound having nonlinear optical activity dispersed in or bonded to a polymer binder, wherein the material contains a tertiary amine derivative represented by the following formula (1) as the organic compound having nonlinear optical activity, and an organic nonlinear optical element using the same.

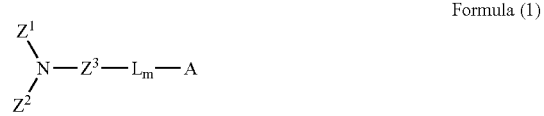

Formula (1)

In the formula, $Z^1$ to $Z^3$ are independently aromatic groups optionally having a substituent; L is a π conjugated group optionally having a substituent; A is a π conjugated electron-attractive group which includes a ring structure optionally having a substituent; m denotes 0 or 1; a π conjugated system denoted by $Z^3$-$L_m$ has, from one terminal thereof to the other terminal, five or more unsaturated bonds which form one conjugated system; and at least two of $Z^1$ to $Z^3$, L and A may be connected so as to form at least one ring structure.

20 Claims, 2 Drawing Sheets

ORGANIC NONLINEAR OPTICAL MATERIAL AND NONLINEAR OPTICAL ELEMENT USING THE SAME

CROSS-REFERENCE TO RELATED APPLICATION

This application claims priority under 35 USC 119 from Japanese Patent Application No. 2004-33803, the disclosure of which is incorporated by reference herein.

BACKGROUND OF THE INVENTION

1. Field of the Invention

The present invention relates to a nonlinear optical element that is applicable to a light modulator, an optical switch, an optical integrated circuit, an optical computer, an optical memory, a wavelength conversion element, and a hologram element that are useful in fields such as optical information communication, optical information processing and imaging in which light is used. Furthermore, the invention relates to an organic nonlinear optical material that is necessary to manufacture the nonlinear optical element.

2. Description of the Related Art

Many functional elements such as a wavelength conversion element, a light modulator and an optical switch that are important in fields such as optical information communication, optical information processing and imaging in which light is used are embodied by using a nonlinear optical material, and particularly a secondary nonlinear optical material. Inorganic nonlinear optical materials such as lithium niobate and potassium dihydrogen phosphate have already been put to practical use and widely used as a secondary nonlinear optical material. However, organic nonlinear optical materials having superiority such as a high nonlinear optical performance, low-priced materials, low manufacturing costs, and a high manufacturability have recently received attention, and active research and development aimed at putting such materials to practical use is being carried out.

In order to exhibit a secondary nonlinear optical effect, it is essential that a center of symmetry does not exist in systems in principle, and such systems are roughly divided into systems in which an organic compound having nonlinear optical activity is crystallized into a crystal structure in the absence of a center of symmetry (hereinafter referred to as a 'crystal system'), and systems in which an organic compound having nonlinear optical activity is dispersed in or bonded to a polymer binder and oriented by some means (hereinafter referred to as a 'polymer system').

It has been known that an organic nonlinear optical material in the above-mentioned crystal system is capable of exhibiting very high nonlinear optical performance. However, it is difficult to manufacture a large organic crystal that is necessary to make an element. Moreover, the organic crystal is so fragile that the organic crystal may be damaged in a process of making an element. On the other hand, preferable properties such as film-forming properties and mechanical strength that are useful for making an element are added to an organic nonlinear optical material in the above-mentioned polymer system by a polymer binder. The polymer system has thus been regarded as promising in view of a high potential for practical use.

With regard to an organic nonlinear optical material in the polymer system, it is required that an organic compound (particles) having nonlinear optical activity is uniformly dispersed or bonded without aggregating in a polymer binder and thus rendered optically homogeneous and transparent. In addition, as described above, anisotropy should be added to an organic compound having nonlinear optical activity by orienting the compound by some means in order to develop the secondary nonlinear optical effect of the resultant element. Moreover, the orientation state must be retained with stability over a long period in a temperature and humidity environment under which the element is put in order to utilize the element as a functional element.

Therefore, an organic compound having nonlinear optical activity that is used as an organic nonlinear optical material of the polymer system is required to have a low aggregating property and a superior compatibility with a polymer binder in addition to a high nonlinear optical performance. The organic nonlinear optical material of the polymer system is generally made into an element in the form of a thin film, and a wet coating method is preferably used to form the thin film. Thus, the organic compound having nonlinear optical activity that is used as the organic nonlinear optical material of the polymer system is required to have a high solubility in a solvent for coating. Meanwhile, a polymer binder needs to have a high glass transition temperature to stably retain the orientation state of the organic compound having nonlinear optical activity that is included in the polymer binder as well as a high film-forming property and mechanical strength.

The organic compound having nonlinear optical activity needs to be oriented as described above so as to exhibit the secondary nonlinear optical activity in the organic nonlinear optical material of the polymer system, and an electric field poling method is generally used as an orienting method therefore. The electric field poling method is an orienting method in which an electric field is applied to a nonlinear optical material and then a nonlinear optically active compound is oriented in the direction of the applied electric field by Coulomb force between a dipole moment of the nonlinear optically active compound and the applied electric field. In the electric field poling method, in addition to the application of an electric field, the organic nonlinear optical material is generally heated to a temperature around a glass transition temperature thereof so as to accelerate molecular motion of the nonlinear optically active compound for supporting of the orientation.

Well-known examples of the organic compound having nonlinear optical activity include tertiary amine derivatives such as Disperse Red 1 (generally abbreviated to DR1) and 4-(dicyanomethylene)-2-methyl-6-(4-dimethylaminostyryl)-4H-pyran (generally abbreviated to DCM) (for example, see Chemistry of Materials, 1999, Vol. 11, pp. 2554 to 2561).

Meanwhile, polymethyl methacrylate (generally abbreviated to PMMA) has been studied the most as the polymer binder. However, the glass transition temperature of PMMA is low (approximately 100° C.), and the orientation state of an organic nonlinear optical material in the polymer system that uses PMMA as the polymer binder gradually relaxes even at room temperature, whereby nonlinear optical performance considerably deteriorates over time. Thus, it has been known that, for this reason, PMMA cannot be used as the material of a practical functional element (for example, see Chemical Reviews, 1994, Vol. 94, No. 1, pp. 31 to 75).

A polymer binder to be used in place of PMMA has been actively searched for in order to solve this problem, and it has been reported that polymers having a higher glass transition temperature than PMMA such as polycarbonate, polyimide and polysulfone are effective (for example, see Japanese Patent Application Laid-Open (JP-A) No.

6-202177). However, when such a polymer having a high glass transition temperature is used as a binder, a heating temperature that is required during electric field poling must be increased. Thus, when DR1 or DCM is used as an organic compound having nonlinear optical activity in combination with the high polymer, such a compound sublimates and disappears, or is oxidized.

Further, these polymer binders having a high glass transition temperature do not necessarily have a favorable compatibility with DR1 and DCM. When DR1 or DCM is contained in a system at a high concentration in order to enhance nonlinear optical performance, the DR1 or DCM particles aggregate or crystallize. Moreover, even when DR1 or DCM is contained in a system at a low concentration, the DR1 or DCM particles aggregate or crystallize due to heating or long passage of time.

Therefore, there is a need for an organic nonlinear optical material which includes a specific organic nonlinear optical compound simultaneously having desired properties such as superior nonlinear optical performance, an amorphous property, oxidation resistance and sublimation resistance, which enables effective use of a polymer binder having a high glass transition temperature, and which has both superior nonlinear optical performance and superior stability, and a nonlinear optical element using the same.

SUMMARY OF THE INVENTION

The inventors of the invention have intensely researched organic compounds having nonlinear optical activity and polymer binders in order to meet the need, have found that the need can be satisfied by utilizing a specific organic compound having nonlinear optical activity, and have completed the invention.

A first aspect of the invention provides an organic nonlinear optical material including an organic compound having nonlinear optical activity dispersed in or bonded to a binder, wherein the material contains a tertiary amine derivative represented by the following formula (1) as the organic compound having nonlinear optical activity;

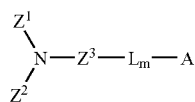

Formula (1)

wherein $Z^1$ to $Z^3$ are independently aromatic groups optionally having a substituent; L is a π conjugated group optionally having a substituent; A is a π conjugated electron-attractive group which includes a ring structure optionally having a substituent; m denotes 0 or 1; a π conjugated system denoted by $Z^3$-$L_m$ has, from one terminal thereof to the other terminal, five or more unsaturated bonds which form one conjugated system; and at least two of $Z^1$ to $Z^3$, L and A may be connected so as to form a ring structure.

A second aspect of the invention provides a nonlinear optical element including the organic nonlinear optical material.

The organic nonlinear optical material of the invention is characterized by including a specific organic nonlinear optical compound simultaneously having desired properties such as superior nonlinear optical performance, amorphous property, heat resistance and sublimation resistance, which organic compound is dispersed in or bonded to a polymer binder having a high glass transition temperature. Even if an organic compound having nonlinear optical activity is contained in the material at a high concentration, the compound particles do not aggregate and are uniformly dispersed. Accordingly, the resultant material has preferable effects such as compatibility between high optical quality and nonlinear optical activity, high thermal stability and stability over time of the orientation state of the organic compound having nonlinear optical activity, and long-term retention of superior properties. Thus, use of the organic nonlinear optical material of the invention allows a nonlinear optical element, which is superior in properties and stability, to be embodied.

BRIEF DESCRIPTION OF THE DRAWINGS

Preferred embodiments of the invention will be described in detail based on the following figures, wherein.

DETAILED DESCRIPTION OF THE INVENTION

Figure 1:
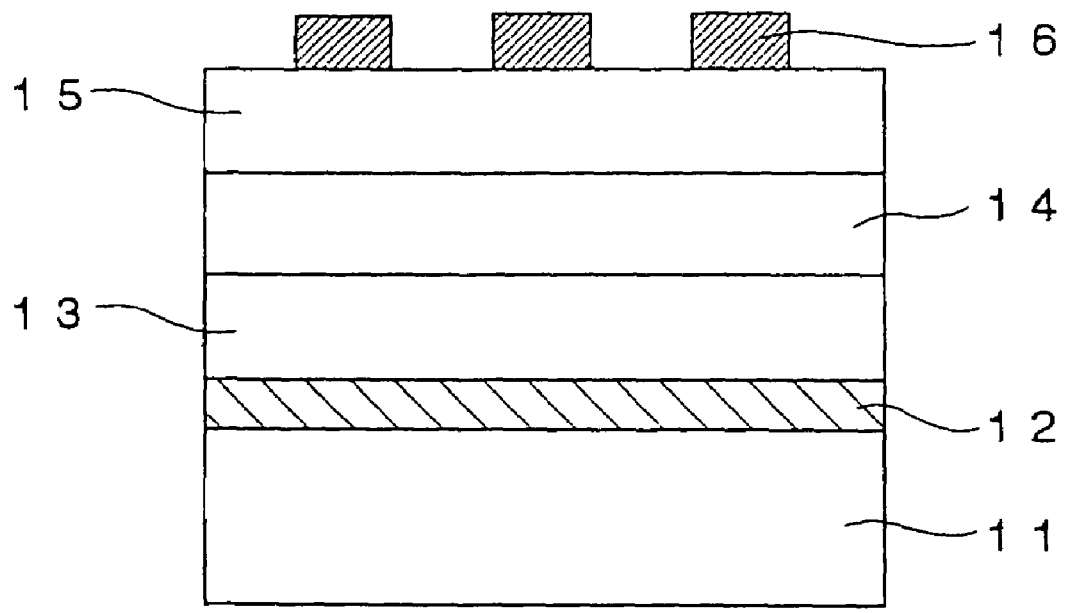
FIG. 1 is a cross-sectional view schematically showing an example of the nonlinear optical element of the invention.

The invention will be hereinafter detailed in accordance with embodiments.

<Organic Nonlinear Optical Material>

An organic nonlinear optical material of the invention includes a tertiary amine derivative represented by the following formula (1) as an organic compound having nonlinear optical activity;

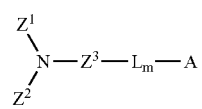

Formula (1)

In formula (1), $Z^1$ to $Z^3$ are independently aromatic groups optionally having a substituent; L is a π conjugated group optionally having a substituent; A is a π conjugated electron-attractive group which includes a ring structure optionally having a substituent; m denotes 0 or 1; a π conjugated system denoted by $Z^3$-$L_m$ has, from one terminal thereof to the other terminal, five or more unsaturated bonds which form one conjugated system; and at least two of $Z^1$ to $Z^3$, L and A may be connected so as to form at least one ring structure.

The tertiary amine derivative represented by formula (1) has such a bulky molecular structure as to have a triarylamine structure and a π conjugated electron-attractive group including a ring structure, and thereby has superior chemical stability such as heat resistance, oxidation resistance and light resistance, a high amorphous property, and superior compatibility with various polymer binders. In addition, the tertiary amine derivative can be designed to have a quite high sublimation temperature so as to avoid the above-mentioned problem of sublimation during electric field poling. Further, the tertiary amine derivative exhibits greatly superior nonlinear optical performance.

It is generally known that a so-called push-pull type π conjugated nonlinear organic compound having an electron-donative group at one terminal of its π conjugated chain and an electron-attractive group at the other terminal thereof can have improved nonlinear optical performance by lengthening the π conjugated chain, or strengthening electron attractiveness of the electron-attractive group or electron donativeness of the electron-donative group. As recited in the invention, the π conjugated chain disposed at the central part of the molecule has, from one terminal thereof to the other terminal, five or more unsaturated bonds which form one conjugated system, whereby nonlinear optical performance can be improved.

Organic Compound Having Nonlinear Optical Activity

First, the organic compound having nonlinear optical activity that is used in the invention will be hereinafter described.

As described above, the organic compound having nonlinear optical activity that is used in the invention is a tertiary amine derivative represented by formula (1). $Z^1$ and $Z^2$ in the tertiary amine derivative are independently aromatic groups that may have a substituent. The aromatic groups are preferably substituted or unsubstituted aryl groups.

$Z^1$ and/or $Z^2$ are particularly preferably aromatic groups which has at least a substituent including a ring structure in view of improvement of its amorphous property. The substituent including a ring structure is particularly preferably a substituted or unsubstituted aryl group in view of nonlinear optical performance.

$Z^3$ is preferably a substituted or unsubstituted 1,4-phenylene group, and more preferably an unsubstituted 1,4-phenylene group.

L is a π conjugated group that may have a substituent. In particular, the invention requires that the π conjugated system denoted by $Z^3$-$L_m$ in the tertiary amine derivative represented by formula (1) has, from one terminal thereof to the other terminal thereof, five or more unsaturated bonds which form one conjugated system. In such a case, as described above, the π conjugated chain in a push-pull type π conjugated compound can be sufficiently lengthened so as to exhibit a particularly preferable effect in view of nonlinear optical performance.

The π conjugated system preferably has six or more unsaturated bonds which form one conjugated system. The upper limit of the number of unsaturated bonds is preferably approximately ten in view of securing of oxidation resistance and its aggregation preventing property. In the invention, as described above, the π conjugated system has at least five unsaturated bonds, with one saturated bond disposed between each unsaturated bond.

Specific examples of $Z^3$-$L_m$ that has, from one terminal thereof to the other terminal thereof, five or more unsaturated bonds which form one conjugated system include the following. In these examples, both terminals (terminals that are respectively connected to N and A in formula (1)) of the π conjugated system are denoted by * and unsaturated bonds which are disposed between the terminals and which form one conjugated system are numbered. In these examples, 'Me' and 'Bu' denote a methyl group and a butyl group, respectively.

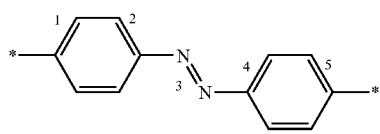

-continued

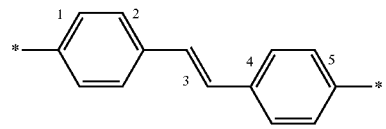

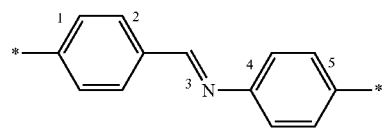

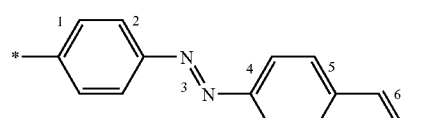

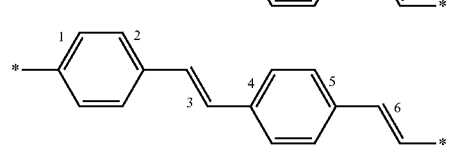

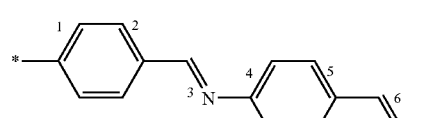

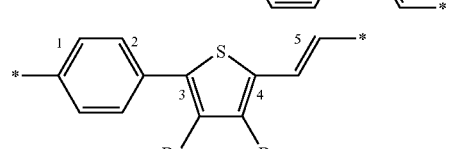

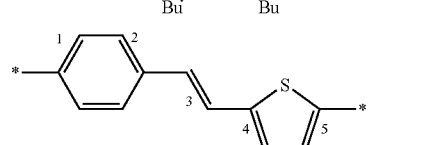

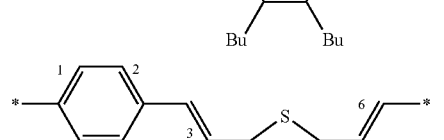

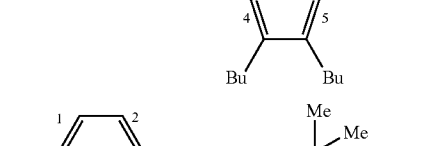

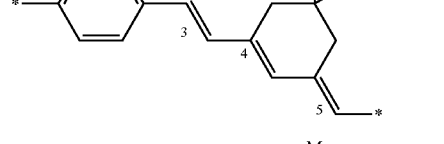

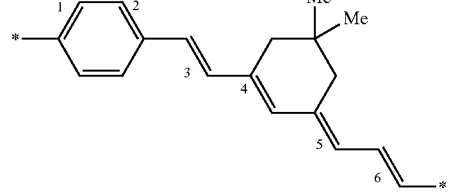

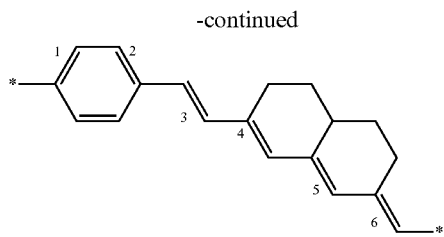

"A" in the tertiary amine derivative represented by formula (1) has a π conjugated electron-attractive group including a ring structure that may have a substituent, and the π conjugated system including the ring structure secures a high amorphous property and high chemical stability. In particular, the π conjugated electron-attractive group including the ring structure preferably has at least one kind of a nitro group, a cyano group and a carbonyl group in view of nonlinear optical performance.

Typical examples of "A" are as follows. The terminal (terminal connected to $L_m$ in formula (1)) is denoted by *. 'Me' and 'Et' in these examples denote a methyl group and an ethyl group, respectively.

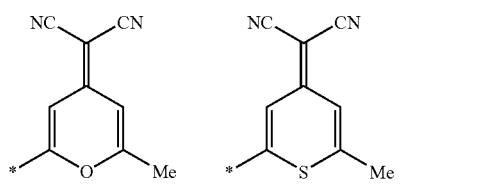

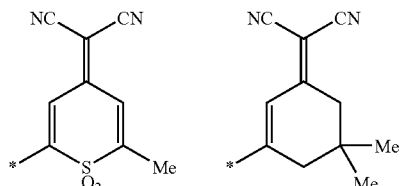

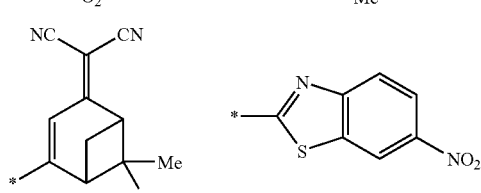

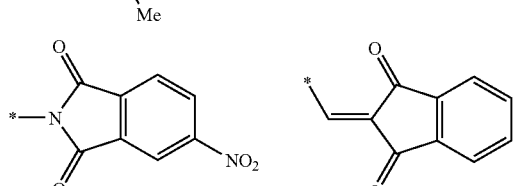

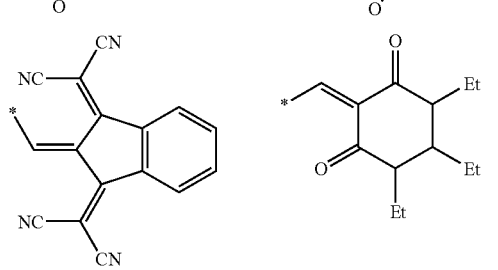

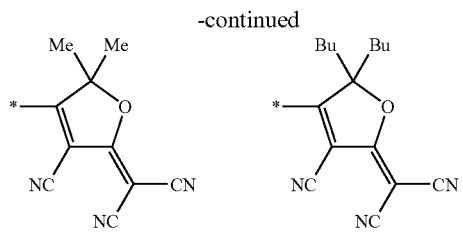

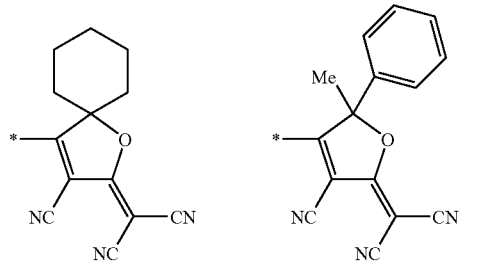

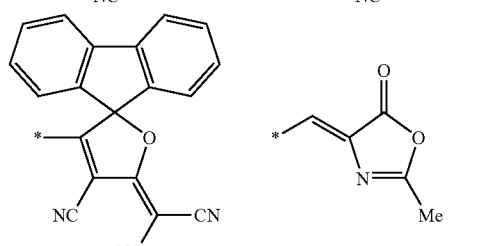

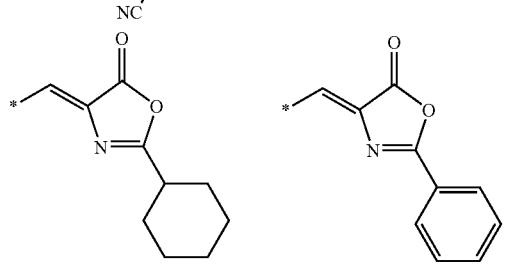

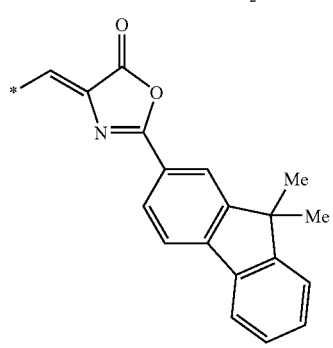

In the invention, at least two of $Z^1$ to $Z^3$, L and A in the tertiary amine derivative represented by formula (1) may be connected so as to form at least one ring structure.

The tertiary amine derivatives represented by formula (1) is particularly preferably a tertiary amine derivative represented by formula (2) in view of easy synthesis, chemical stability and nonlinear optical performance.

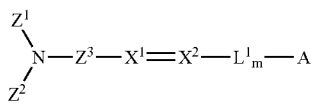

Formula (2)

In formula (2), $X^1$ and $X^2$ are independently N or CH; $L^1$ is a π conjugated group that may have a substituent and does not include an unsaturated bond that is not included in, is not directly connected to and is not adjacent to a ring structure. $Z^1$ to $Z^3$ and A are the same as in formula (1).

The 'unsaturated bond that is not included in, is not directly connected to and is not adjacent to the ring structure' in $L^1$ means an unsaturated bond that is isolated from a ring structure. The unsaturated bond is chemically unstable. Therefore, it is not preferable that such an unsaturated bond is included in the organic compound.

Specific examples of the organic compound having nonlinear optical activity that is preferably used in the invention include the following. In these examples, 'Me', 'Et' and 'Bu' denote a methyl group, an ethyl group and a butyl group, respectively.

-continued

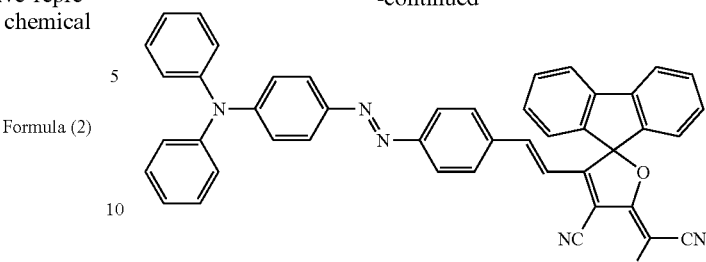

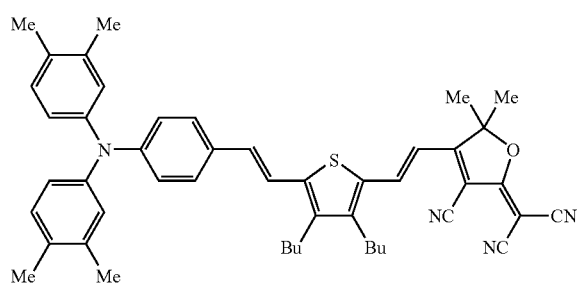

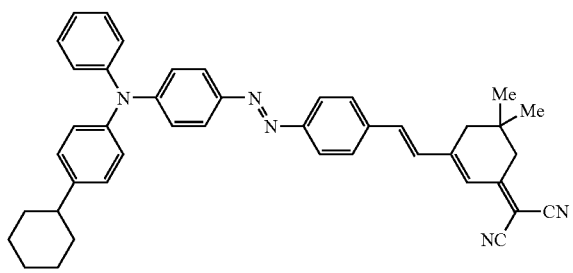

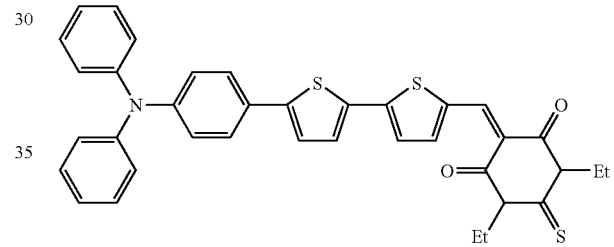

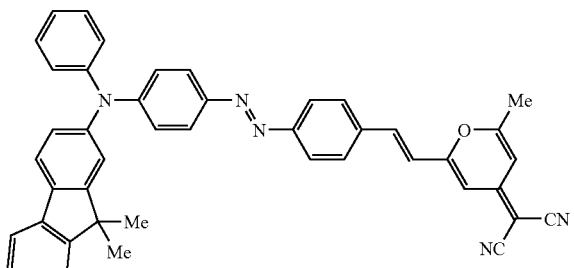

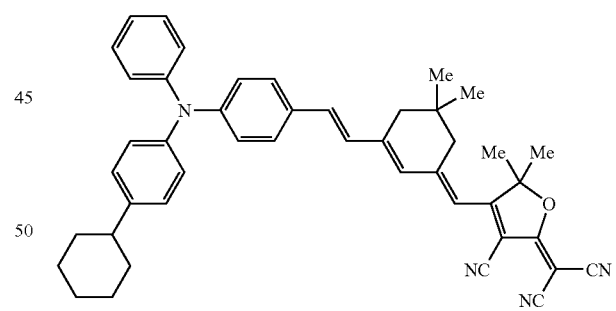

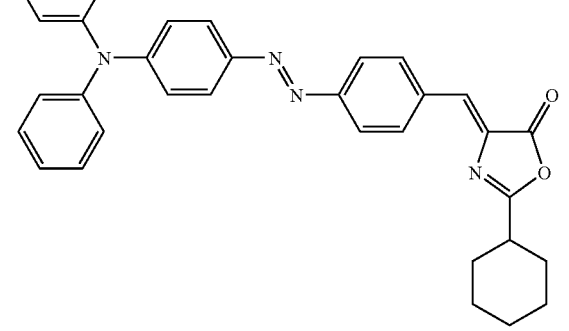

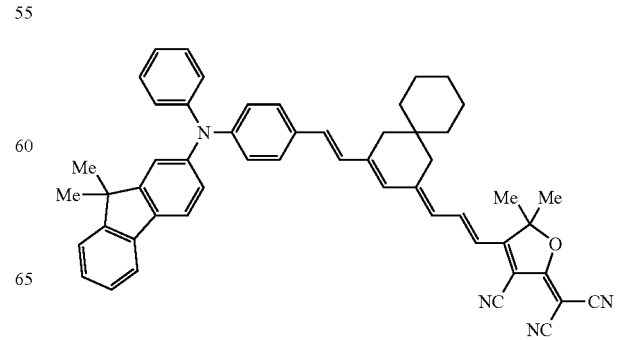

-continued

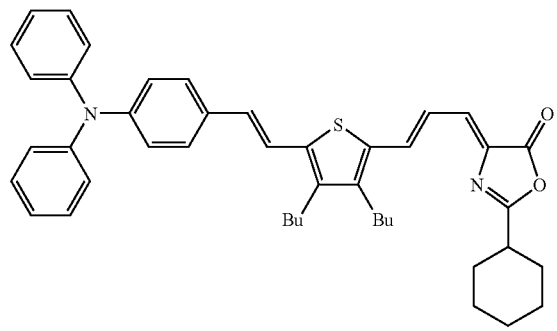

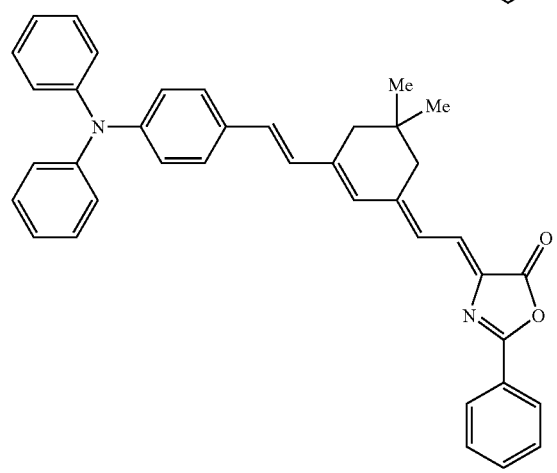

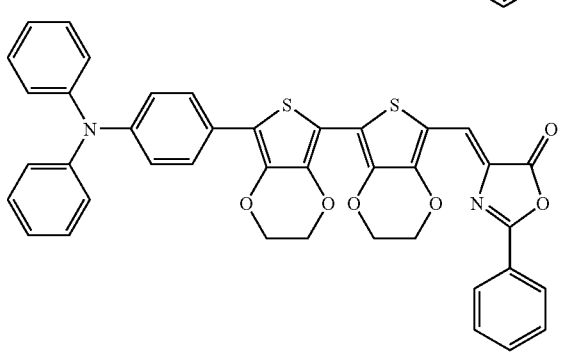

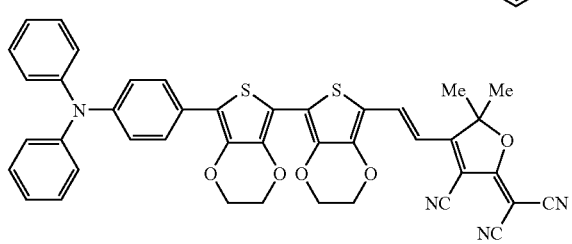

Any method can be utilized as a method of synthesizing the tertiary amine derivative represented by formula (1). For example, a method as described below is useful, in which a corresponding formyl compound and a corresponding electron-attractive compound having an active methyl group are dehydrated and condensed in the presence of a base. A method of synthesizing the formyl compound can be a formylating method such as Vilsmeier method. A method of synthesizing the electron attractive compound having an active methyl group can be any of those described in "Synthetic Communications, 1995, Vol. 25, No. 19, pp. 3045 to 3051" and "Chemistry of Materials, 2002, Vol. 14, pp. 2393 to 2400".

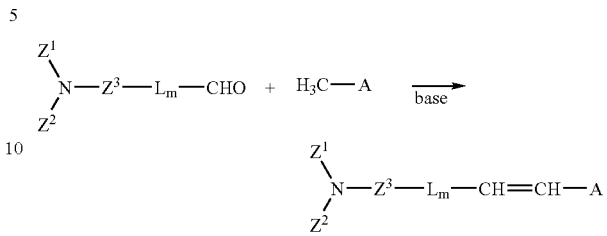

The sublimation temperature of the organic compound having nonlinear optical activity that is used in the invention is preferably about 130° C. or more, and more preferably about 170° C. or more.

As described above, the organic compound having nonlinear optical activity that is used in the invention is required to have a superior solubility in a solvent of a coating solution used in manufacture of the organic nonlinear optical material. With regard to the solubility, the organic nonlinear optical compound is preferably dissolved in a solvent, such as tetrahydrofuran, cyclopentanone, chloroform or N,N-dimethylacetamide, at room temperature by 1% by mass or more, and more preferably by 5% by mass or more.

The electro-optic constant of the organic compound having nonlinear optical activity that is used in the invention is preferably 10 pm/V or more, and more preferably 25 pm/V or more.

The electro-optic constant can be measured by an ordinary measuring method such as ATR method or an ellipso reflection method.

Polymer Binder

Any polymer binder having superior optical quality and a superior film-forming property can be used in the invention, and the glass transition temperature thereof is preferably 150° C. or more. A polymer binder having a glass transition temperature of 170° C. or more is particularly preferable. Specific examples thereof include polyimide, polycarbonate, polyarylate and polycycloolefin.

In the invention, the glass transition temperatures of the polymer binder and an organic nonlinear optical material described later are measured with a differential scanning calorimeter (DSC). Measurement is started at room temperature and is conducted at a programming rate of 10° C. per minute. A temperature corresponding to the intersection of a base line and the gradient of a raising portion in an endothermic process caused by glass transition is regarded as a glass transition temperature.

An organic nonlinear optical material of the invention includes the organic compound having nonlinear optical activity and the polymer binder. The organic compound having nonlinear optical activity may be dispersed in the polymer binder in a molecule state or chemically connected to a side chain or chains, or the main chain of the polymer binder.

The organic nonlinear optical material of the invention may have any form but, when used in a nonlinear optical element, is generally utilized in the form of a thin film. Known methods such as an injection molding method, a press molding method, a soft lithographic method and a wet coating method can be utilized as a method of manufacturing a thin film containing the organic nonlinear optical material of the invention. Among them, a wet coating method, in which a solution obtained by dissolving the organic compound with nonlinear optical activity and the polymer binder in an organic solvent is applied onto an appropriate substrate by a spin coating method, a blade coating method, a dip coating method or an ink jet method to form a film, is preferable from the viewpoints of convenience of a manufacturing device, suitability for mass production and film quality (uniformity of film thickness and few defects such as air void).

Any organic solvent that can dissolve the organic compound having nonlinear optical activity and the polymer binder is used as the organic solvent used in the wet coating method, and the boiling point thereof is preferably in the range of about 50 to about 200° C. When an organic solvent having a boiling point of less than 50° C. is used, at least a part of the solvent evaporates during storage of a coating solution including the solvent, changing (raising) the viscosity of the coating solution. Moreover, the rate of volatilization of such a solvent is so high during coating as to cause dew condensation. These phenomena are relatively remarkable. Meanwhile, when an organic solvent having a boiling point of more than 200° C. is used, it may be difficult to remove the solvent after coating and the remaining organic solvent may act undesirably as a plasticizer for the polymer binder, dropping the glass transition temperature of the binder.

Typical examples of the organic solvent include tetrahydrofuran, methyltetrahydrofuran, dioxane, diethylene glycol dimethyl ether, methyl ethyl ketone, cyclopentanone, cyclohexanone, ethyl acetate, cyclohexanol, dichloroethane, chloroform, toluene, chlorobenzene, xylene, N,N-dimethylformamide, N,N-dimethylacetamide and dimethyl sulfoxide. These organic solvents may be used alone or in the form of a mixture thereof.

The content of the organic compound having nonlinear optical activity in the organic nonlinear optical material of the invention cannot be clearly defined, since it depends on desired nonlinear optical performance and mechanical strength, and the kind of the organic compound having nonlinear optical activity. However, in general, the content is preferably in the range of about 1 to about 90% by mass with respect to the total mass of the organic nonlinear optical material. When the content is less than 1% by mass, insufficient nonlinear optical performance is often obtained. When the content is more than 90% by mass, insufficient mechanical strength tends to be obtained. The content of the organic compound having nonlinear optical activity in the organic nonlinear optical material is more preferably in the range of about 10 to about 75% by mass, and still more preferably in the range of about 25 to about 60% by mass.

The preferable content of the organic compound having nonlinear optical activity when it is dispersed in the polymer binder is the same as that when the organic compound having nonlinear optical activity is connected to the polymer binder.

The organic nonlinear optical material of the invention can include various additives in addition to the organic compound having nonlinear optical activity and the polymer binder, if necessary. For example, the organic nonlinear optical material can include a known antioxidant such as 2,6-di-tert-butyl-4-methylphenol or hydroquinone in order to prevent the organic compound having nonlinear optical activity and/or the polymer binder from deteriorating due to oxidation, and/or a known ultraviolet absorbent such as 2,4-dihydroxybenzophenone or 2-hydroxy-4-methoxybenzophenone in order to prevent the organic compound having nonlinear optical activity and/or the polymer binder from deteriorating due to ultraviolet rays.

In the case of wet coating, a coating solution to be used may include a known leveling agent such as silicone oil so as to improve surface smoothness of the resultant coated film, or, when the organic nonlinear optical compound and/or the polymer binder has a curable cross-linking functional group, a known curing catalyst and/or a curing assistant to accelerate cross-linking and curing.

The organic nonlinear optical material of the invention is manufactured, for example, as a thin film by applying the coating solution thus prepared to a substrate by, for example, the above-described spin coating method. As described above, a polymer binder having a comparatively high glass transition temperature is used in the invention. The organic nonlinear optical material containing the organic compound having nonlinear optical activity preferably has a high glass transition temperature from the viewpoint of heat resistance.

The glass transition temperature of the organic nonlinear optical material, therefore, is preferably about 130° C. or more, and more preferably about 150° C. or more.

As described above, the organic compound having nonlinear optical activity needs to be oriented in order to cause secondary nonlinear optical activity to arise in a nonlinear optical material of a polymer system. An orienting method therefor can be a method in which a nonlinear optical material of a polymer system is applied to a substrate having on the surface thereof an oriented film and the orienting property of the oriented film is used to induce orientation of the organic compound having nonlinear optical activity in the nonlinear optical material of the polymer system. Moreover, a known poling method such as an optical poling method, a photoassisted electric field poling method or an electric field poling method can also be effectively utilized. Among these, an electric field poling method is particularly preferable in view of convenience of an apparatus used and a high degree of obtained orientation.

The electric field poling method is roughly divided into a contact poling method in which a nonlinear optical material is sandwiched by a pair of electrodes and an electric field is applied to the pair of electrodes, and a corona poling method in which the surface of a nonlinear optical material disposed on a substrate electrode is subjected to corona discharge and the corona-discharge-incused electric field is applied to the substrate electrode. The electric field poling method is an orienting method in which a nonlinear optical compound is oriented (poled) in the direction of an applied electric field by Coulomb force between dipole moment of the nonlinear optical compound and the applied electric field.

In the electric field poling method, a nonlinear optical material is generally heated at a temperature around the glass transition temperature thereof while an electric field is being applied thereto. Thereby, orientation movement of a nonlinear optical compound toward the direction of the electric field is promoted. After sufficient orientation is induced, the nonlinear optical material is cooled down to room temperature while the electric field is still being applied. After the orientation state has been frozen, the applied electric field is removed. This orientation state, however, has a fundamental problem in that it is basically in a thermodynamic non-equilibrium state and therefore gradually becomes random over time even at a temperature less than the glass transition temperature and that nonlinear optical activity deteriorates.

The larger the difference between environmental temperature, at which a nonlinear optical material is used, and the glass transition temperature of the nonlinear optical material is, the more slowly the phenomenon in which the orientation state becomes random over time progresses. Therefore, a nonlinear optical material including a binder resin which has a high glass transition temperature and therefore having a high glass transition temperature can substantially solve this problem in practical use. A polymer binder having a glass transition temperature of 150° C. or more is preferably used in the invention. Even in this case, the organic compound having nonlinear optical activity used in the invention has a high sublimation temperature, as described above. Therefore, the organic compound neither sublimates nor deteriorates during heating. As a result, a nonlinear optical material having superior nonlinear optical performance and superior stability can be manufactured.

There is a numerical value (order parameter:$\phi$) which can be used as an index to confirm whether poling has been performed and which indicates how many nonlinear optical molecules (generally having dichroism) have been oriented in the direction of an electric field. Specifically, the absorbance when the directions of molecules are random is denoted as $A0$ and the absorbance when the molecules have been oriented in the direction of an electric field (direction of film thickness) is denoted as $At$, then $\phi$ can be calculated from the expression of $1-(At/A0)$.

The order parameter is 1 in an ideal state in which all the molecules have been completely oriented, and 0 in a completely random state. The larger the order parameter is, the higher the degree of orientation as a whole of the molecules is. From a measured value, it can be judged how efficiently poling has been performed and stability of the nonlinear optical material can be evaluated.

<Nonlinear Optical Element>

A nonlinear optical element of the invention includes the organic nonlinear optical material of the invention. These are no limitation on the nonlinear optical element as long as it operates on the basis of nonlinear optical effect. Specific examples thereof include a wavelength conversion element, a photorefractive element and an electrooptical element. The nonlinear optical element is particularly preferably an electrooptical element that operates on the basis of an electro-optic effect, such as an optical switch, a light modulator and a phase-shifting apparatus.

An element in which a layer of a nonlinear optical material is formed on a substrate and sandwiched by a pair of electrodes for input electric signals is preferably utilized as the electrooptical element.

Examples of the material of the substrate include metals such as aluminum, gold, iron, nickel, chromium and titanium; semiconductors such as silicon, titanium oxide, zinc oxide and gallium-arsenide; glass; and plastics such as polyethylene terephthalate, polyethylene naphthalate, polycarbonate, polysulfone, polyether ketone and polyimide.

An electrically conductive film may be formed on the surface of the substrate. Examples of the material for the electrically conductive film include metals such as aluminum, gold, nickel, chromium and titanium; electrically conductive oxides such as tin oxide, indium oxide, ITO (complex oxide of indium oxide and tin oxide) and IZO (complex oxide of indium oxide and zinc oxide); and electrically conductive polymers such as polythiophene, polyaniline, polyparaphenylene-vinylene and polyacethylene. The electrically conductive film is formed by utilizing a known dry film-forming method such as vacuum evaporation or sputtering, or a known wet film-forming method such as dip coating orelectrodeposition, and, if necessary, may be patterned. An electrically conductive substrate or the electrically conductive film that is formed on the substrate is utilized as an electrode (hereinafter abbreviated to a 'lower electrode') during poling and driving of the element.

An adhesive layer to improve adhesion between the substrate and the film formed on the substrate, a leveling layer to smooth the substrate surface having irregularities, or an interlayer to provide both of these functions can be formed on the substrate surface, if necessary. Examples of the materials of these layers include, but are not limited to, known resins such as acrylic resins, methacrylic resins, amide resins, vinyl chloride resins, vinyl acetate resins, phenol resins, urethane resins, vinyl alcohol resins and acetal resins and copolymers thereof; and known cross-linked products of zirconium chelating compounds, titanium chelating compounds and silane coupling agents and co-crosslinked products thereof.

An electrooptical element serving as the nonlinear optical element of the invention preferably includes a waveguide structure. The nonlinear optical material of the invention is particularly preferably contained in the core layer of a waveguide.

A clad layer (hereinafter abbreviated to a 'lower clad layer') may be formed between the core layer containing the nonlinear optical material of the invention and a substrate. Any clad layer that has a refractive index lower than that of the core layer and is not damaged during formation of the core layer can be used as the lower clad layer. Typical examples of the material thereof include UV curable or thermosetting resins such as acrylic resins, epoxy resins, oxetane resins, thiirane resins and silicone resins; polyimide; and glass.

After the core layer including the nonlinear optical material of the invention is formed, a clad layer (hereinafter abbreviated to an 'upper clad layer') may be further formed on the core layer in the same manner as the lower clad layer is. Thus, a slab-type waveguide in which a substrate, a lower clad layer, a core layer, and an upper clad layer are disposed in this order is formed.

After the core layer is formed, it can be patterned by a known method using techniques of a semiconductor manufacturing method such as reactive ion etching (RIE), photolithography and electron-beam lithography so as to form a channel type waveguide or a ridge type waveguide. Alternatively, a part of the core layer is exposed to UV light or electron beam to change the refractive index of the irradiated portion, whereby a channel type waveguide can be formed.

An electrode (hereinafter abbreviated to 'upper electrode') via which input electric signals are applied to the surface of the upper clad layer is formed in a desirable area of the upper clad layer. Thus, a basic electrooptical element can be formed.

When the channel type waveguide or the ridge type waveguide is formed as described above, a known device structure such as a linear structure, a Y branch structure, a directional coupler or a Mach-Zehnder types can be formed as the pattern of the core layer. The resultant waveguide can be applied to a known device for optical information communication such as an optical switch, a light modulator and a phase-shifting apparatus.

EXAMPLES

The present invention will be further detailed hereinafter by referring to examples but is not limited thereto.

Example 1

Manufacture of Organic Nonlinear Optical Material

Three parts by mass of the following organic compound having nonlinear optical activity (sublimation temperature: ≧200° C.) which is a triarylamine derivative represented by formula (2) (tertiary amine derivative represented by formula (1) and having a partial structure of $Z^3$-$L_m$ including, from one terminal thereof to the other terminal, six unsaturated bonds that form one conjugated system, and 7 parts by mass of poly[Bisphenol A carbonate-co-4,4'-(3,3,5-trimethylcyclohexylidene)diphenol carbonate] (manufactured by Aldrich Corporationand and having a glass transition temperature of 200° C.) which is a polycarbonate are dissolved in 90 parts by mass of cyclopentanone (boiling point: 130° C.) to prepare a solution. The solution is applied to a glass substrate (2 cm×2 cm) having thereon a pair of parallel electrodes (distance therebetween: 20 μm) made of gold by a spin coating method. The resultant coating is dried at 130° C. for one hour. Thus, a thin film 1 having a film thickness of 0.1 μm is obtained.

The thin film 1 is very clear and the triarylamine derivative is homogeneously dispersed therein. The glass transition temperature of the thin film 1 is 160° C.

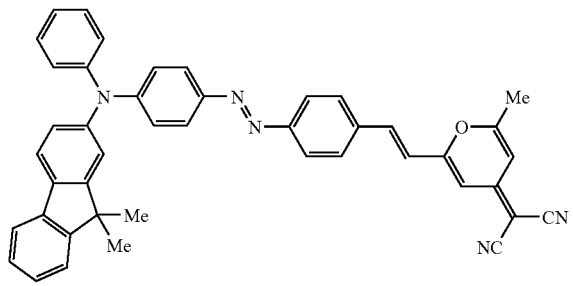

Next, the thin film 1 is kept at 170° C. for 30 minutes while an electric field of 50 V/μm is being applied between the pair of parallel electrodes. Then, the thin film 1 is cooled down to room temperature while application of the electric field is maintained. Thereafter, the electric field is removed. With regard to deterioration of the poled state of the thin film 1 over time, an order parameter immediately after manufacturing and an order parameter after the thin film has been stored in a dark place for 10 days are both 0.31. Thus, it has been confirmed that orientation relaxation has not occurred at all.

The absorption spectra of a thin film A which is not subjected to poling and in which the orientation state of the nonlinear optical compound is random, and a thin film B in which the nonlinear optical compound has been oriented in the direction of a film thickness thereof by poling are measured by a spectrophotometer (U-3000 (trade name) manufactured by Hitachi, Co., Ltd.) in the wavelength range of visible light immediately after manufacture of the thin films A and B. The order parameters of these films are calculated from the following expression (1) and absorbance of each film at a wavelength λmax at which absorption of the film is the largest.

$$\phi = 1 - At/A0 \qquad \text{Formula (1)}$$

In formula (1), φ denotes an order parameter, At denotes absorbance at the wavelength λmax of the thin film B that has been subjected to poling, and A0 denotes absorbance at the wavelength λmax of the thin film A that is not subjected to poling.

Evaluation of Organic Nonlinear Optical Material

The thin film 1 thus obtained which is made of an organic nonlinear optical material and which has been subjected to electric field poling is exposed to light from a semiconductor laser having an oscillation wavelength of 1550 nm, and a second harmonic generation (SHG) light of 775 nm can be observed. Thereby, it has been confirmed that the thin film 1 effectively functions as a nonlinear optical material. In addition, the nonlinear optical material is stored at a high temperature of 65° C. for 10 days and then again exposed to the laser light. It has been confirmed that SHG light which has the same intensity as the SHG light before the storage does occurs.

When the thin film after being stored at high temperature is observed by an optical microscope, it has been confirmed that the thin film is very clear and the triarylamine derivative is homogeneously dispersed in polycarbonate in a molecular state. In addition, the surface of this thin film 1 is soldered such that the surface temperature of the thin film is approximately 200° C. This is conducted to provide for manufacture of an element using this organic nonlinear optical material. The triarylamine derivative is not sublimated and the shape of the thin film is not transformed.

From the above facts, it is understood that the organic nonlinear optical material of the invention has high heat resistance and stability over time.

Comparative Example 1

A thin film made of an organic nonlinear optical material is manufactured in the same manner as in Example 1, except that the organic compound having nonlinear optical activity used in Example 1 is replaced with DCM (manufactured by Aldrich Corporation). However, microcrystals of DCM have been observed in the film and a desired transparent and homogeneous film cannot be obtained.

Comparative Example 2

A thin film including an organic nonlinear optical material and subjected to electric field poling is manufactured in the same manner as in Example 1 except that the organic compound having nonlinear optical activity used in Example 1 is replaced with the following tertiary amine derivative which is the same as that represented by formula (1) except that a portion thereof corresponding to $Z^3$-$L_m$ has three unsaturated bonds and which has a sublimation temperature of 200° C. or more. In addition, nonlinear optical performance thereof is evaluated in the same manner as in Example 1.

Occurrence of SHG can be observed, however, the strength thereof is as low as approximately 30% of Example 1. In addition, after the film has been stored at a high temperature of 65° C. for 10 days, microcrystals of the tertiary amine derivative slightly appear and transparency of the film deteriorates.

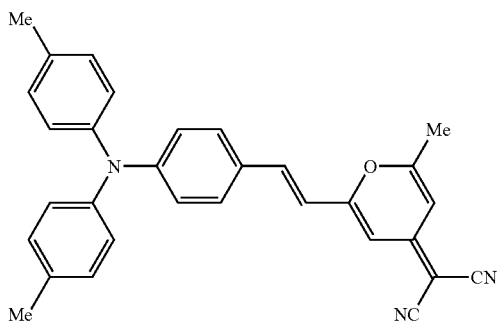

Example 2

Manufacture of Organic Nonlinear Optical Material

A thin film 2 including an organic nonlinear optical material that has been subjected to electric field poling is manufactured in the same manner as in Example 1 except that the organic compound having nonlinear optical activity used in Example 1 is replaced with an organic compound having nonlinear optical activity which has the following structural formula (A) and a sublimation temperature of 200° C. or more, and which is a tertiary amine derivative represented by formula (2) (a tertiary amine derivative represented by formula (1) and having a partial structure of $Z^3$-$L_m$ that has, from one terminal thereof to the other terminal thereof, six unsaturated bonds, except that polycarbonate serving as a polymer binder is replaced with polycycloolefin (Arton (trade name) manufactured by JSR Corporation, and having a glass transition temperature of 170° C.) represented by the following structural formula (B), and except that the poling temperature is changed to 140° C.

The thin film 2 is very clear and the tertiary amine derivative is homogeneously dispersed therein. The glass transition temperature of the thin film 2 is 135° C.

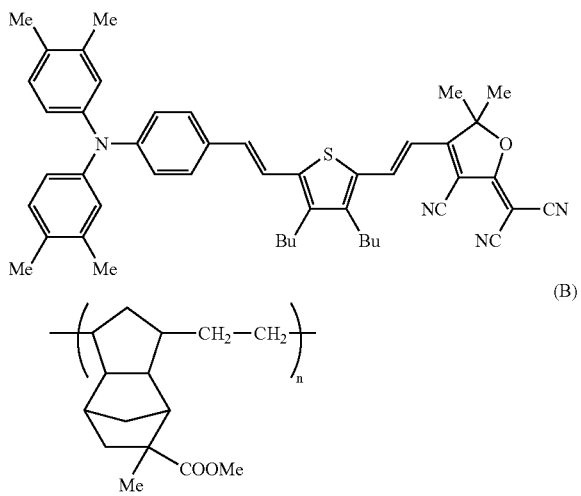

With regard to deterioration of the poled state of the thin film 2 over time, an order parameter immediately after manufacturing and an order parameter after the thin film has been stored in a dark place for 10 days are both 0.34. Thus, it has been confirmed that orientation relaxation has not occurred at all. In addition, the surface of this thin film 2 is soldered such that the surface temperature of the thin film is approximately 200° C. This is conducted to provide for manufacture of an element using this organic nonlinear optical material. The triarylamine derivative is not sublimated and the shape of the thin film is not transformed.

Evaluation of Organic Nonlinear Optical Material

The thin film 2 is evaluated in the same manner as in Example 1, and occurrence of SHG having an intensity which is approximately 1.5 times as strong as that obtained in Example 1 can be observed. Thereby, it has been confirmed that the thin film 2 effectively functions as a nonlinear optical material. In addition, after the nonlinear optical material has been stored at a high temperature of 65° C. for 10 days, it is confirmed that SHG light which has the same intensity as the SHG light before the storage does occurs. When the thin film after being stored at high temperature is observed by an optical microscope, it is confirmed that the thin film is very clear and the triarylamine derivative is homogeneously stably dispersed in polycycloolefin in a molecular state.

From the above facts, it is understood that the organic nonlinear optical material of the invention has high heat resistance and stability over time.

Comparative Example 3

A thin film including an organic nonlinear optical material that has been subjected to electric field poling is manufactured in the same manner as in Example 2 except that the organic compound having nonlinear optical activity used in Example 2 is replaced with a tertiary amine derivative (sublimation temperature: ≧200° C.) represented by the following structural formula.

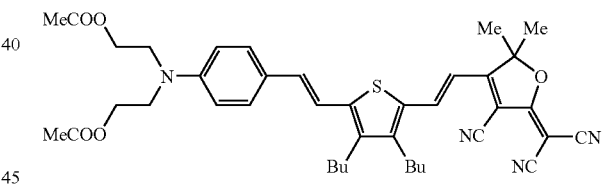

Nonlinear optical performance of the thin film is evaluated in the same manner as in Example 1, and occurrence of SHG having the same strength as that of the thin film 2 in Example 2 can be initially observed. However, after the film has been stored at a high temperature of 65° C. for 10 days, deteriorations of transparency and the intensity of SHG light due to appearance of microcrystals are observed.

Example 3

Manufacture of Nonlinear Optical Element

An UV curable acrylic resin (NOA72 (trade name) manufactured by Norland) is applied to a glass substrate (2 cm×2 cm), on which an ITO electrically conductive film is formed as a lower electrode, by a spin coating method. The resultant coating is exposed to ultraviolet light (high-pressure mercury-vapor lamp manufactured by Ushio Inc.) at 100 mW/cm² for 30 seconds and then heated at 120° C. for 30 minutes. Thus, a lower clad layer having a film thickness of 2 μm is formed.

Next, the solution containing polycycloolefin and the tertiary amine derivative that are employed in Example 2 is applied to the surface of the lower clad layer by a spin coating method and the resultant coating is dried at 120° C. for one hour to form a core layer having a film thickness of 2 µm. In addition, the same UV curable acrylic resin as the resin of the lower clad layer is applied to the surface of the core layer in the same manner as the lower clad layer is. Thus, an upper clad layer having a film thickness of 2 µm is formed and, as a result, a slab type waveguide in which the substrate, the lower clad layer, the core layer, and the upper clad layer are disposed in this order.

Subsequently, stripes of gold thin films (stripe width: 20 µm, stripe interval: 30 µm) are formed on the surface of the upper clad layer by using an ordinary photolithographic method and a sputtering method and are used as an upper electrode.

The resultant sample is cut into tips having a width of 5 mm by a dicer (manufactured by Disco Corporation), and the cut surface is abraded by sandpaper to manufacture a nonlinear optical element whose cross-section is shown in FIG. 1.

Evaluation of Nonlinear Optical Element

An electric field of 150 V/µm is applied between the upper electrode 16 and a lower electrode 12 of the nonlinear optical element, and the nonlinear optical element is subjected to electric field poling at 140° C. for 30 minutes.

Figure 2:
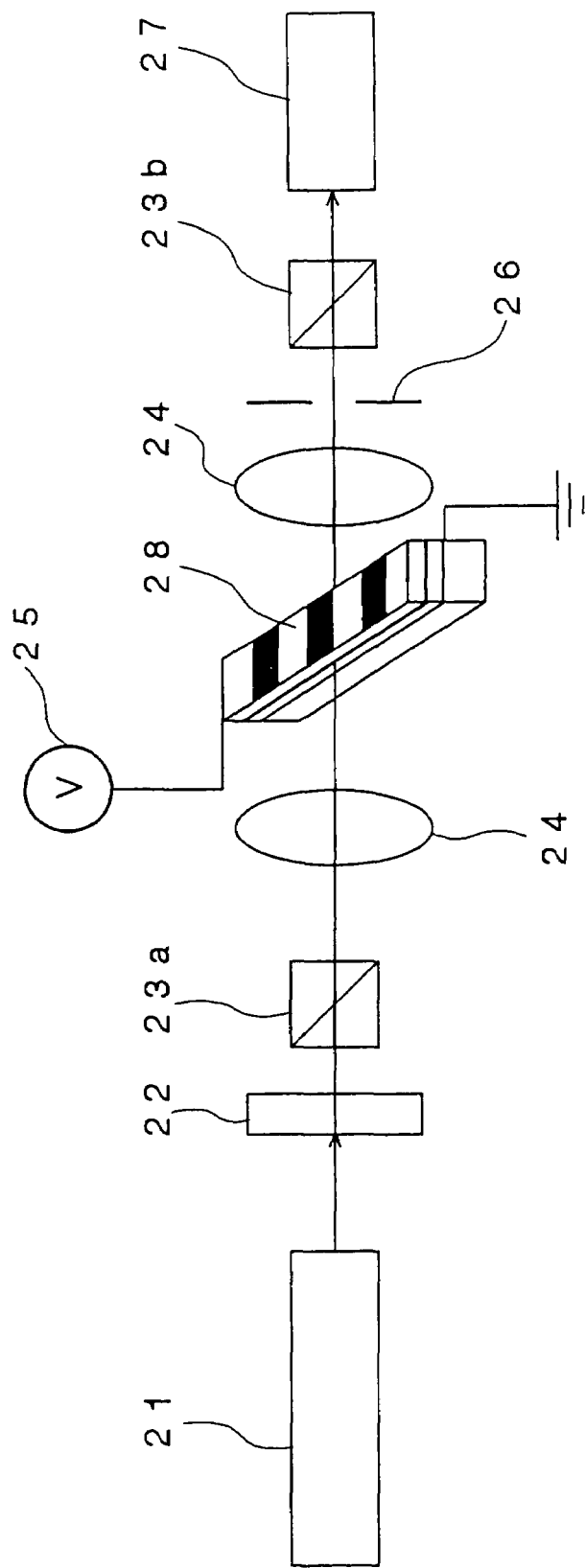
FIG. 2 is a view of the schematic configuration of an evaluation system of nonlinear optical elements.

In order to confirm that the nonlinear optical element that has been subjected to electric field poling functions as an electrooptical element, electrooptical properties are evaluated by an evaluation system shown in FIG. 2.

In the evaluation system shown in FIG. 2, light, which is emitted from a light source 21, namely a laser, (VCSEL (trade name) manufactured by Fuji Xerox Co., Ltd., and having an oscillation wavelength of 850 nm), and which passes through a half-wavelength plate and a polarizer 23a, enters from an end face (on the left side in FIG. 2) of an electrooptical element 28, is propagated through a core layer in the electrooptical element 28, goes out of the other end face (on the right side in FIG. 2) of the electrooptical element 28, passes through a pin hole 26 and a polarizer 23b, whose polarization plane is aligned with that of the polarizer 23a, and is detected by a photodetector 27. The numeral 24 in FIG. 2 is a lens.

The nonlinear optical element manufactured above is provided as the electrooptical element 28 and an electric field is applied between these upper and lower electrodes by a power source 25. When the electric field intensity is changed from 0 V to 5 V, the behavior in which larger electric field intensity results in smaller detected light intensity can be confirmed. The reason for this is that the nonlinear optical element has an electro-optic effect and that light modulation occurs in accordance with application of an electric field. Thereby, the behavior shows that the nonlinear optical element effectively functions as a light modulator. Next, the nonlinear optical element is stored at 65° C. for 10 days and is evaluated again in the same manner. It can be confirmed that a light modulation property which is the same as that before storage is observed and that the nonlinear optical element has high heat resistance and stability over time.

What is claimed is:

1. An organic nonlinear optical material comprising an organic compound having nonlinear optical activity dispersed in or bonded to a polymer binder, wherein the material contains a tertiary amine derivative represented by the following formula (1) as the organic compound having the nonlinear optical activity;

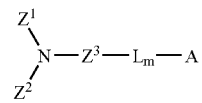

Formula (1)

wherein $Z^1$ to $Z^3$ are independently aromatic groups optionally having a substituent; L is a π conjugated group optionally having a substituent; A is a π conjugated electron-attractive group which includes a ring structure optionally having a substituent; m denotes 0 or 1; a π conjugated system denoted by $Z^3$-$L_m$ has, from one terminal thereof to the other terminal, five or more unsaturated bonds which form one conjugated system; and at least two of $Z^1$ to $Z^3$, L and A may be connected so as to form at least one ring structure.

2. A nonlinear optical element comprising an organic nonlinear optical material according to claim 1.

3. A nonlinear optical element according to claim 2, wherein the nonlinear optical element operates on the basis of an electro-optic effect.

4. A nonlinear optical element according to claim 2, wherein at least one of $Z^1$ and $Z^2$ in the tertiary amine derivative represented by formula (1) is an aromatic group which has a substituent including a ring structure.

5. A nonlinear optical element according to claim 2, wherein the tertiary amine derivative represented by formula (1) is a tertiary amine derivative represented by the following formula (2);

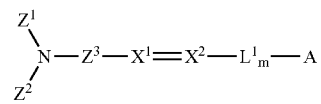

Formula (2)

wherein $X^1$ and $X^2$ are independently N or CH; $L^1$ is a π conjugated group optionally having a substituent and not including an unsaturated bond which is not included in, is not directly connected to and is not adjacent to a ring structure; and $Z^1$ to $Z^3$ and A are the same as in formula (1).

6. A nonlinear optical element according to claim 2, wherein A in the tertiary amine derivative represented by formula (1) is a π conjugated electron-attractive group having at least one of a nitro group, a cyano group and a carbonyl group, and including a ring structure.

7. A nonlinear optical element according to claim 2, wherein the polymer binder contains at least one of polyimide, polycarbonate, polyarylate and polycycloolefin.

8. A nonlinear optical element according to claim 2, wherein $Z^3$ in the tertiary amine derivative represented by formula (1) is a substituted or unsubstituted 1,4-phenylene group.

9. A nonlinear optical element according to claim 2, wherein the π conjugated system denoted by $Z^3$-$L_m$ in the tertiary amine derivative represented by formula (1) comprises five to ten unsaturated bonds which form one conjugated system.

10. A nonlinear optical element according to claim 2, wherein the π conjugated system denoted by $Z^3$-$L_m$ in the tertiary amine derivative represented by formula (1) comprises six to ten unsaturated bonds which form one conjugated system.
11. A nonlinear optical element according to claim 2, wherein the organic compound has one of the following structures
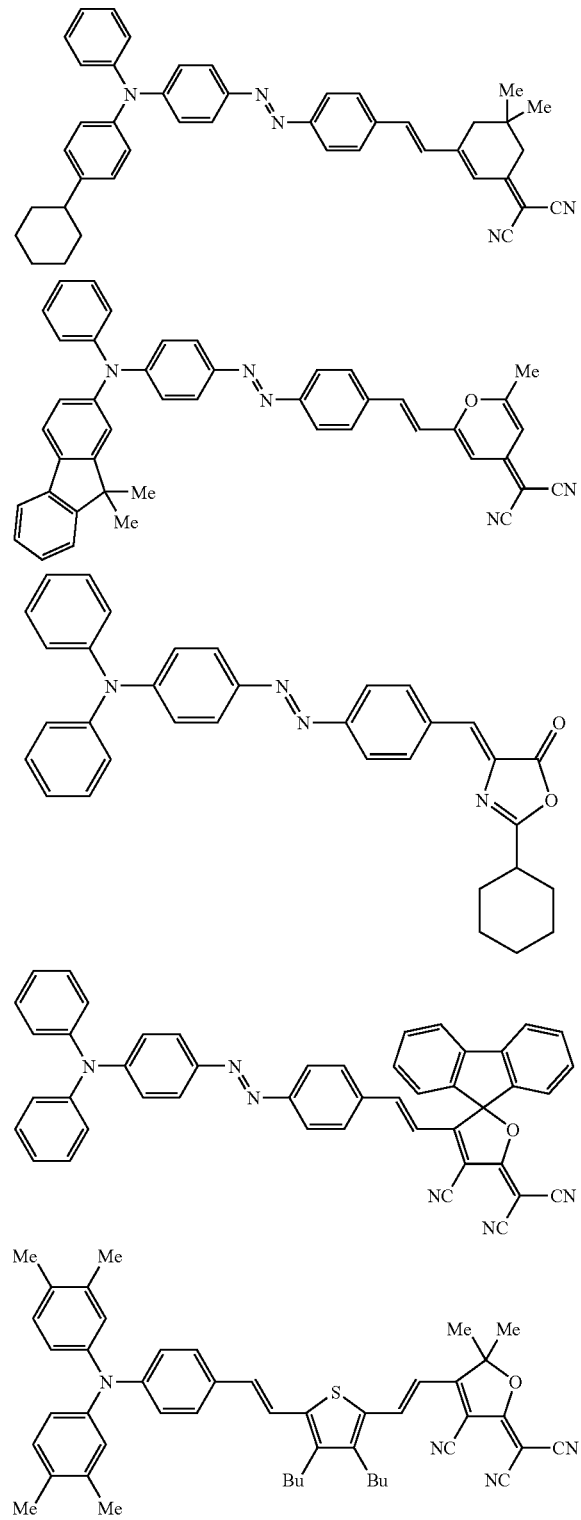
-continued
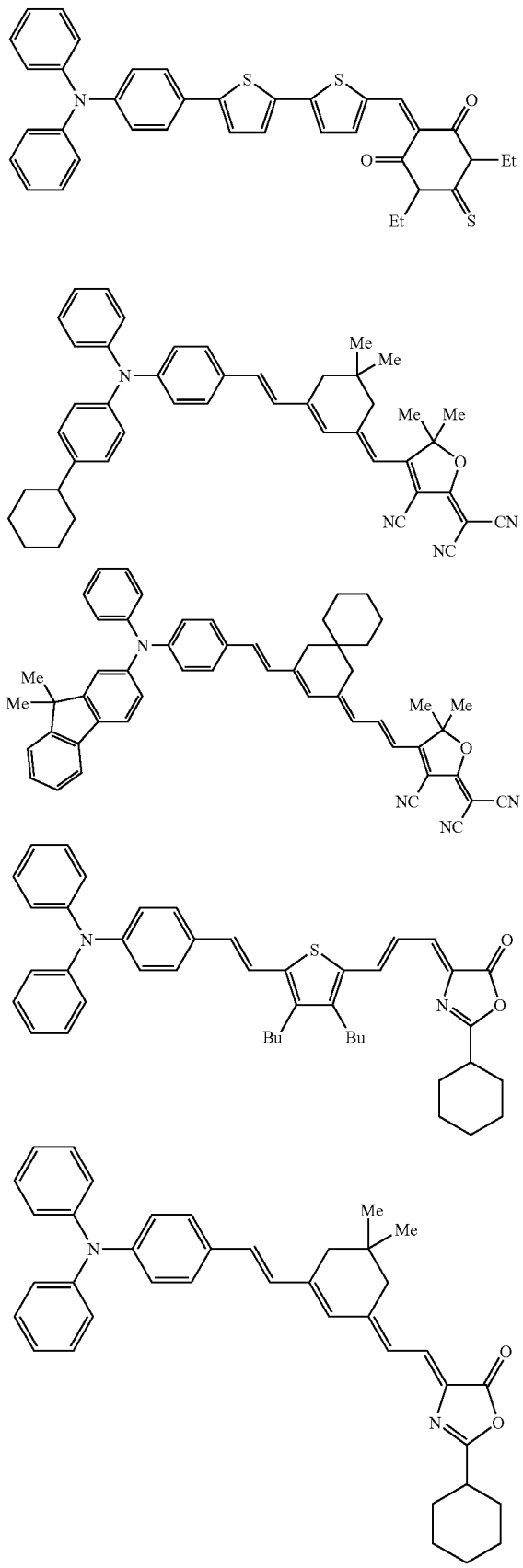

-continued

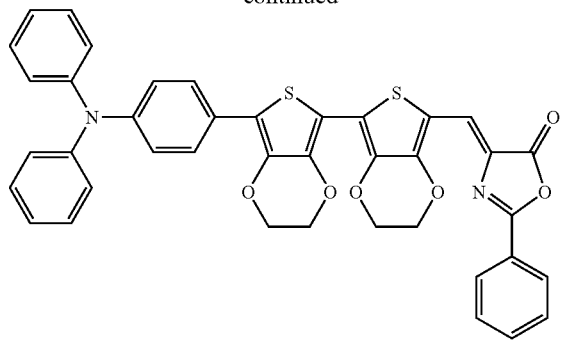

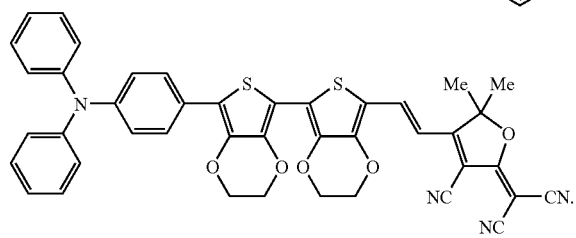

12. An organic nonlinear optical material according to claim 1, wherein at least one of $Z^1$ and $Z^2$ in the tertiary amine derivative represented by formula (1) is an aromatic group which has a substituent including a ring structure.

13. An organic nonlinear optical material according to claim 1, wherein the tertiary amine derivative represented by formula (1) is a tertiary amine derivative represented by the following formula (2);

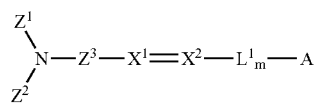

Formula (2)

wherein $X^1$ and $X^2$ are independently N or CH; $L^1$ is a π conjugated group optionally having a substituent and not including an unsaturated bond which is not included in, is not directly connected to and is not adjacent to a ring structure; and $Z^1$ to $Z^3$ and A are the same as in formula (1).

14. An organic nonlinear optical material according to claim 1, wherein A in the tertiary amine derivative represented by formula (1) is a π conjugated electron-attractive group having at least one of a nitro group, a cyano group and a carbonyl group, and including a ring structure.

15. An organic nonlinear optical material according to claim 1, wherein the polymer binder contains at least one of polyimide, polycarbonate, polyarylate and polycycloolefin.

16. An organic nonlinear optical material according to claim 1, wherein $Z^3$ in the tertiary amine derivative represented by formula (1) is a substituted or unsubstituted 1,4-phenylene group.

17. An organic nonlinear optical material according to claim 1, wherein $Z^3$ in the tertiary amine derivative represented by formula (1) is a nonsubstituted 1,4-phenylene group.

18. An organic nonlinear optical material according to claim 1, wherein the π conjugated system denoted by $Z^3$-$L_m$ in the tertiary amine derivative represented by formula (1) comprises five to ten unsaturated bonds which form one conjugated system.

19. An organic nonlinear optical material according to claim 1, wherein the π conjugated system denoted by $Z^3$-$L_m$ in the tertiary amine derivative represented by formula (1) comprises six to ten unsaturated bonds which form one conjugated system.

20. An organic nonlinear optical material according to claim 1, wherein the organic compound has one of the following structures

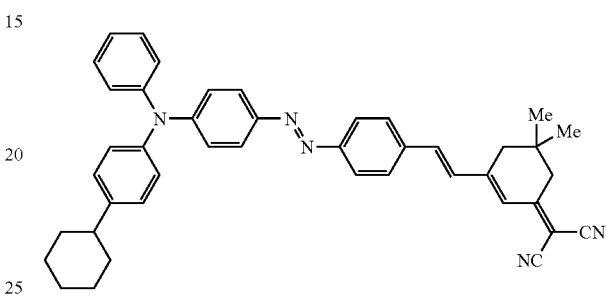

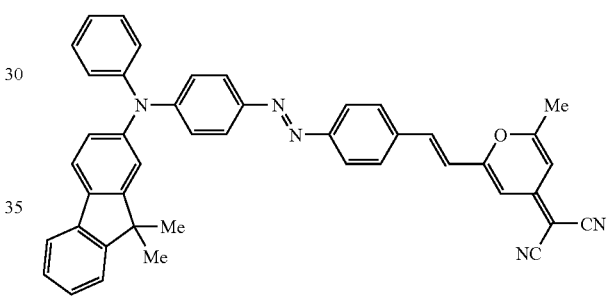

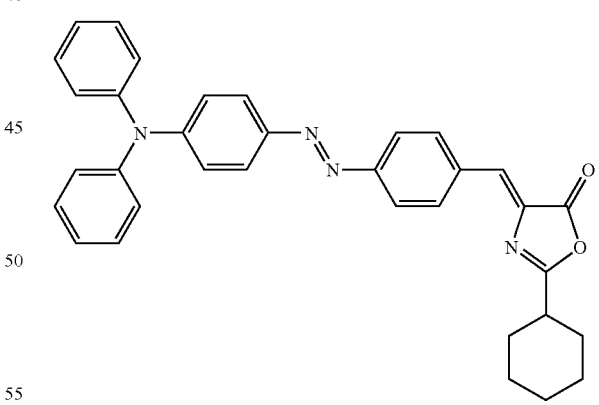

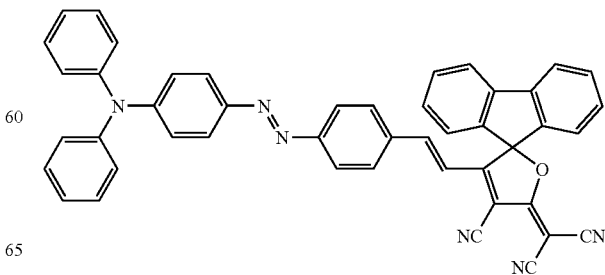

-continued
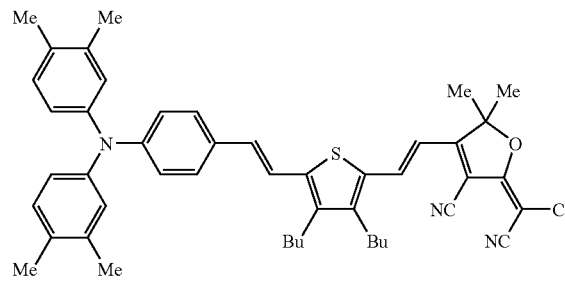
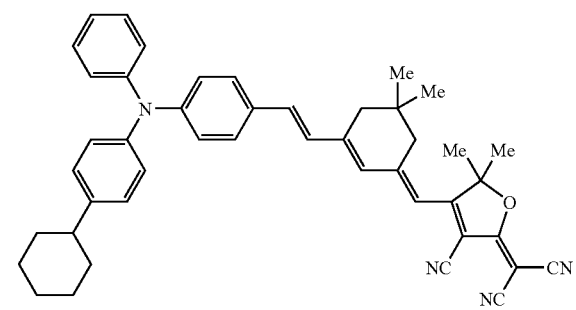
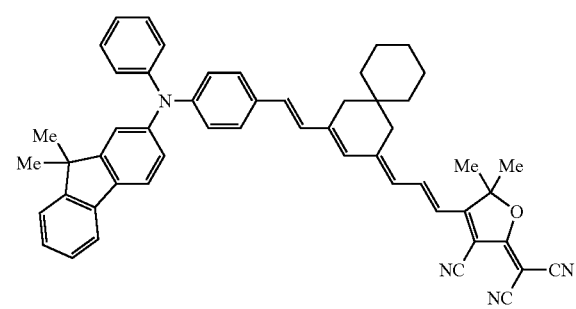
-continued
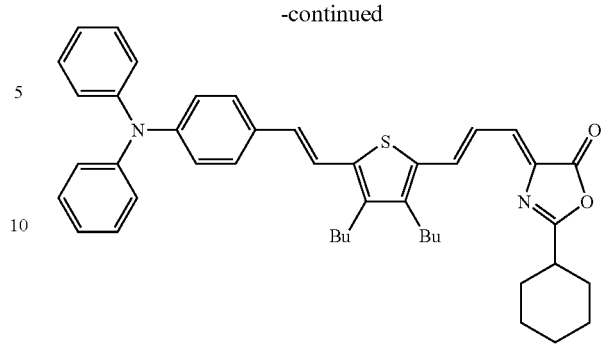
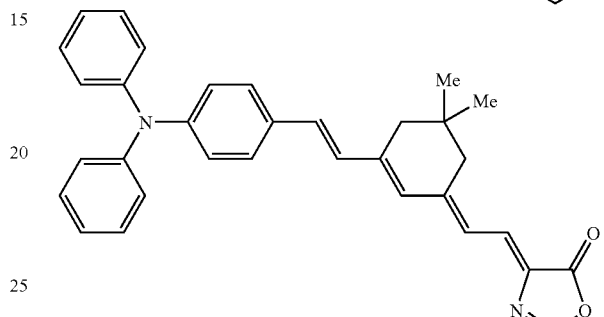
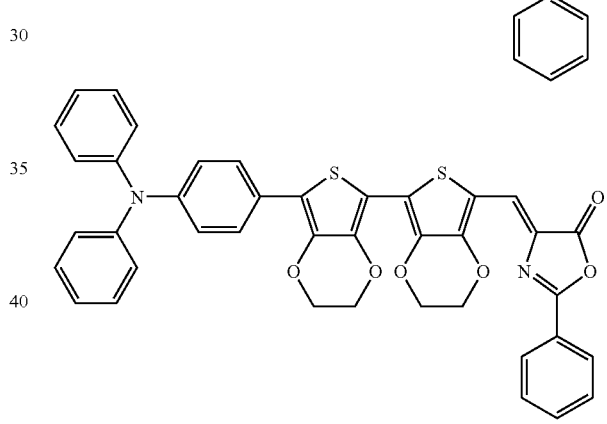
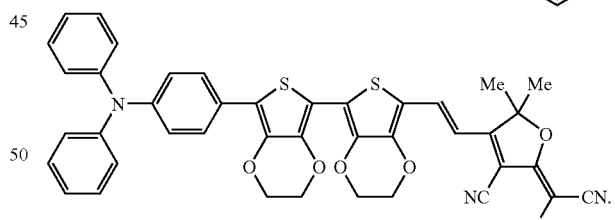
* * * * *